J. R. GAMMETER.
VULCANIZING MOLD FOR TIRE CASINGS.
APPLICATION FILED JULY 25, 1921.
1,417,509. Patented May 30, 1922.
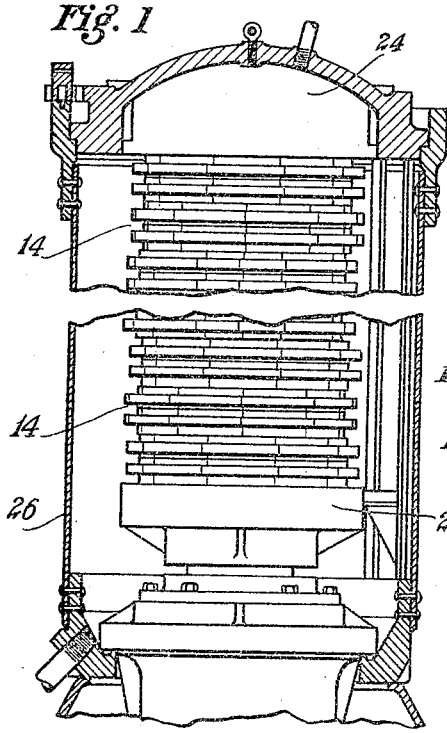
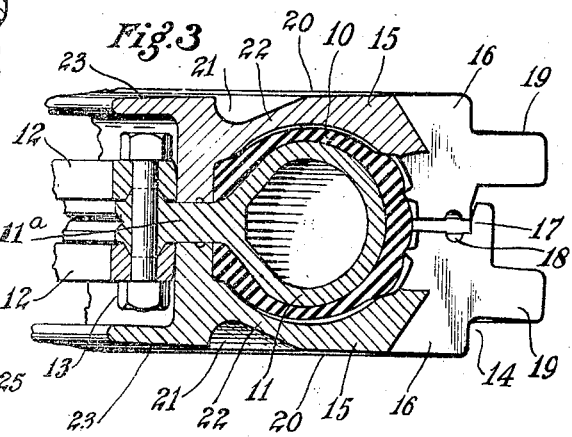
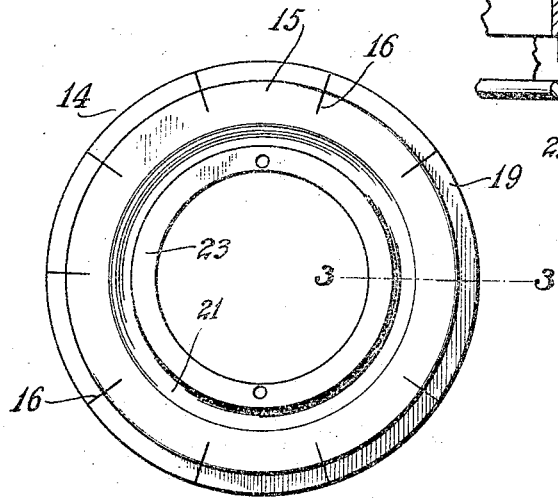
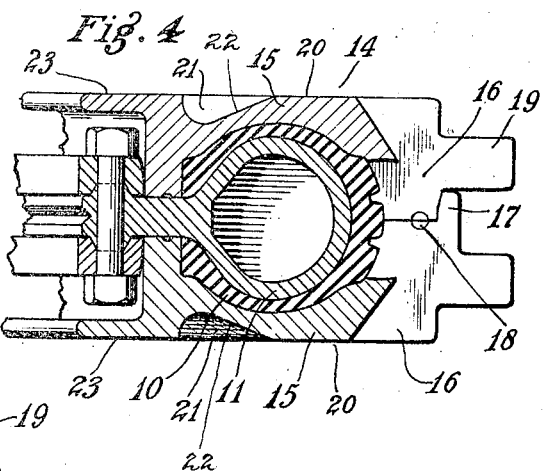
Inventor
John R Gammeter
By Robert M Pierson
Atty

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

VULCANIZING MOLD FOR TIRE CASINGS.

1,417,509.

Specification of Letters Patent. Patented May 30, 1922.

Application filed July 25, 1921. Serial No. 487,440.

*To all whom it may concern:*

Be it known that I, JOHN R. GAMMETER, a citizen of the United States, residing at Akron, in the county of Summit and State of Ohio, have invented a certain new and useful Vulcanizing Mold for Tire Casings, of which the following is a specification.

This invention relates to the art of vulcanizing pneumatic tires on their mandrels in metal molds, and its principal object is to provide improved means for causing the casing to be molded as desired without substantially displacing the fabric or carcass elements, and without marring the rubber surface by the presence of air or moisture between the mold and the tire.

Of the accompanying drawings:

Fig. 1 is a vertical section of an open-steam vulcanizer press containing a stack of tire molds constructed according to my invention.

Fig. 2 is a plan view of one of the molds.

Fig. 3 is a cross-section at a selected place on the mold, showing the latter with a core and tire therein, and sprung open at the tread or outer periphery.

Fig. 4 is a similar view showing the mold completely closed on the tire.

In the drawings, 10 is the tire casing which it will be understood comprises the usual carcass composed of bias-cut, square-woven fabric, or thread or cord layers, together with outer side-wall and tread rubber, breaker strip and bead elements. Straight-side beads are here shown, but they might be of the clincher type, and a non-skid tread is represented but the invention also applies to the making of smooth-tread casings. 11 is the usual rigid mandrel or core which remains in place during vulcanization and is preferably the core on which the tire has been built up, this core for an inextensible-bead tire being made in sections connected by tongue-rings 12 and bolts 13.

14 is the outer mold composed of two halves 15, 15 enclosing the tire as well as the body portion and those portions of the tongue 11ª of the core 11 which are contained in the tire. While these mold members may be made of cast iron or any other suitable metal, I prefer to make them of wrought steel, machined to the desired shape and finish, particularly when the mold embodies the spring characteristic forming a feature of my invention, since its use enables the mold to be made light, strong, compact and with a minimum volume of metal to be carried through the heat cycle of the vulcanizing process.

Each mold member 15 is provided in its outer margin with a circumferential series of clefts or slots 16, 16 made by a thin saw or milling tool in substantially radial planes transverse to the plane of the mold and of a greater or less number according to the size of the mold, there being here shown ten of these slots, disposed at regular intervals around the circumference and registering in the two halves. These slots extend to the middle plane of separation between the mold members, so that the overflow fins of rubber which exude into them from the tire during the molding operation will connect with the circumferential or middle fin or rand of overflow rubber, and they also preferably extend, as shown, to the outer edge of the mold and to its upper and lower surfaces. They extend transversely of the mold cavity far enough on both sides to take in the thickest part of the tread or supporting surface of the tire, and may terminate in this direction more or less around on the sides of the tire. The depth of these clefts, at and adjacent to the top and bottom surfaces of the mold, is such as to afford the desired degree of flexibility to the intermediate segments of metal, and is preferably about the same there as at the parting plane. But it may be less than the minimum in between, as shown, depending somewhat upon the nature of the machining operation in making these cuts.

Registration is secured by the usual dowels (not shown) and by the usual telescopic formation at 17, adjacent to which there is shown the usual annular over-flow channel 18. 19, 19 are prying flanges on the outer circumferences of the mold members. The top and bottom surfaces 20, 20 of the mold in the normal or uncompressed condition of its members are slightly inclined or concavely coned, as represented in Fig. 3, and the members are annularly grooved at 21 to make relatively thin portions 22 having sufficient flexibility to afford a hinging action of the mold walls over the undercut portions of the core body, adjacent to the beads of the tire casing. The mold members are also provided with plane thrust-receiving surfaces at 23, partly formed on a pair of inwardly-projecting flanges, these surfaces coming together in adjacent molds or against the press plates when sufficient pressure is exerted to close the molds at the tread or outer periphery, as shown in Fig. 4. The result of this construction is that the mold members 15 tend to come together first upon the tongue of the core 11 and upon the tire beads, at the inner periphery, and to remain slightly open at the tread or outer periphery until sufficient axial pressure is exerted to close them at the tread. It is possible, however, to obtain some of the important advantages of my invention by using the radial clefts 16 merely as an improvement in a mold of ordinary construction whose top and bottom surfaces are always parallel or made permanently of the form shown in Fig. 4.

In the preferred mode of operating my invention, a core 11, with a tire casing built up thereon, is placed in the mold 14 and a stack of such molds located between the top and bottom plates 24, 25 of a vulcanizer press such as the press 26 shown in Fig. 1, this view showing an open-steam pot press vulcanizer of familiar type. The molds are then put under sufficient hydraulic pressure substantially to close them together at the beads and to keep these portions of the tire firmly confined between the core and the mold from the beginning of the heating period. The best results are obtained if the mold members 15 are fairly hot when the tire is placed between them, so that the raw rubber in the tire quickly tends to become soft and plastic. This condition may be obtained, for example, by emptying and filling the molds in a comparatively brief time, so that they retain a considerable part of their heat from the previous vulcanizing operation. The hydraulic pressure in the initial stage will be such that the mold members 15 do not come together at the tread or outer periphery but will sufficiently compress and indent the rubber at the margins or shoulders of the tread zone to seal off the mold cavity at the sides of the tire against the entrance of the steam which it is preferred to use as a heating medium. Steam being admitted to the interior of the vulcanizer to surround and heat the molds 14 and the tire cords 11, the rubber then becomes very plastic and readily flows to fill the non-skid tread markings and other recesses in the mold and to permeate the fabric and bead elements of the tire. The relation between the cross-sectional dimensions of the raw tire and the mold cavity is preferably such that while the tire casing 10 is tightly clamped between the mold and the core at the beads, there is a slight clearance or at least only a very light pressure between the mold and the sides of the tire from the region adjacent to the beads outwardly to the tread.

After the lapse of a sufficient period for the tire to become thoroughly hot and soft, the mold may be completely closed thereon, as shown in Fig. 4, by the application of sufficient hydraulic pressure to spring the members 15 together at the tread, and the vulcanization may then proceed to completion with the mold thus closed. The initial heating period with the mold in the condition shown in Fig. 3 may be such as merely to soften the rubber without causing it to become set or vulcanized by the action of the sulfur and accelerator with which it is compounded, or the heating under these conditions may be carried far enough partially to set or cure the rubber on the plies of the carcass, and thus aid in holding the threads of the carcass against relative displacement by the flow of the rubber toward the tread of the tire. In either case the molding of the tire substantially to its ultimate configuration is or may be substantially complete at the end of the initial stage of heating, before complete closure of the mold, and this molding takes place under a considerable degree of pressure by reason of the swelling of the rubber, usually with the formation of substantial overflow fins or rands (not shown in the drawings) in the various radial clefts 16 and in the circumferential cleft at the parting plane, so that the rubber at the end of the initial stage is found to be dense in texture and free from blisters or sponginess. By way of example, if the total heating period for a complete cure is fifty minutes, the initial heating stage with the mold sprung open at the tread may be of ten minutes' duration without a substantial amount of setting or curing, or it may be of twenty minutes' duration with a partial setting of the rubber in the carcass, this rubber being properly compounded with relation to the tread and side-wall rubber to give the desired effect. The final cure in the fully-closed mold may then be for a period of forty or thirty minutes, causing a complete setting of the rubber in both the carcass and the tread and side-wall portions under such conditions as to increase its densification and produce the desired degree of compactness in all parts of the tire. The initial heating and flow of the rubber at the surface of the tread and side walls having occurred under conditions of relatively light pressure, it is found that the fabric in the carcass remains substantially in the position in which it was laid, so that the plies are smooth and free from buckles or creases.

My invention considered as a spring mold has the advantage over prior molds of the same general type that the fabric in the carcass may be firmly anchored and molded at the beads while the initial flow of rubber is taking place, before the mold is closed at the tread.

The transverse radial clefts 16 also have the important function of acting as vents for the discharge of any air or water of condensation which might tend to become pocketed between the mold and the sides of the tire and thus mar the surface formation, and I may employ this improvement in an ordinary mold not having the spring feature as previously indicated, with the result that a perfectly-formed tire of increased durability, by reason of having a less highly compacted structure, may be produced by employing a smaller degree of hydraulic pressure than has heretofore been necessary.

Various other changes in construction and mode of procedure may also be effected without departing from the scope of my invention, as, for example, by using a spring mold or one having an initial clearance from the tire at the sides and between the mold members at the tread, while fully closed upon the tire at the beads, substantially as represented in Fig. 3, and allowing it to remain in such relation to the core 11 throughout the entire vulcanizing period. Or, the full hydraulic pressure for progressively closing the mold of Fig. 3 toward and at its outer periphery may be applied as soon as the molds are placed in the vulcanizer and the latter closed, the steam being then turned on and the tire heated and vulcanized in the fully-closed mold.

I claim:

1. A tire mold comprising a pair of continuous annular members formed with a molding cavity, said mold having its tread portion transected by a series of venting slots.

2. Tire-molding apparatus comprising a rigid core, and an enclosing mold composed of members formed in their tread-molding portions with a circumferentially-disposed series of transverse venting slots extending from the outer edge of the mold radially inward and terminating at points corresponding substantially to the side margins of the ground-contacting portion of the tire.

3. Tire-molding apparatus comprising a rigid core, and a pair of annular spring molding members normally tending to separate at the tread while in closed relation with the core at their inner periphery.

4. Tire-molding apparatus comprising a core, and a mold formed with transverse tread slots and including a pair of annular molding members normally tending to spring open at the tread while closed at the beads.

5. A tire mold comprising a pair of annular spring members formed with a molding cavity and transverse slots connecting said cavity with the outer edge of the mold, said mold having normally concave top and bottom pressure-transmitting surfaces.

6. A tire mold member comprising a ring formed with substantially one-half of a tire-molding cavity on its inner surface, a continuous bead and side forming portion, a tread-forming portion transected by radial slots dividing it into spring segments integral with said bead and side forming portion, and annular concentric pressure-transmitting surfaces on the outside of said member, separated by a groove forming a relatively-thin hinging wall over the side-molding portion of the tire cavity adjacent the bead-molding portion, the surface of larger diameter being normally farther from the median plane of the molding cavity than the one of smaller diameter and adapted to be brought to the same level therewith by pressure used in closing the mold at its outer periphery 7. Tire-molding apparatus comprising a rigid core having body and tongue portions, a pair of annular mold members enclosing said core and transected by radial slots dividing their outer margins into spring segments, said members normally springing apart at the tread while closed against the core tongue at the beads and having concentric, annular, pressure-transmitting surfaces separated by annular grooves, the surfaces of larger diameter being normally further apart but adapted to be brought level with those of smaller diameter by pressure used in closing the mold at its outer periphery.

In witness whereof I have hereunto set my hand this 19 day of July 1921.

JOHN R. GAMMETER.